June 28, 1932.    M. M. HOLM    1,865,008
PROCESS FOR THE MANUFACTURE OF ALUMINUM CHLORIDE
Filed Sept. 27, 1927
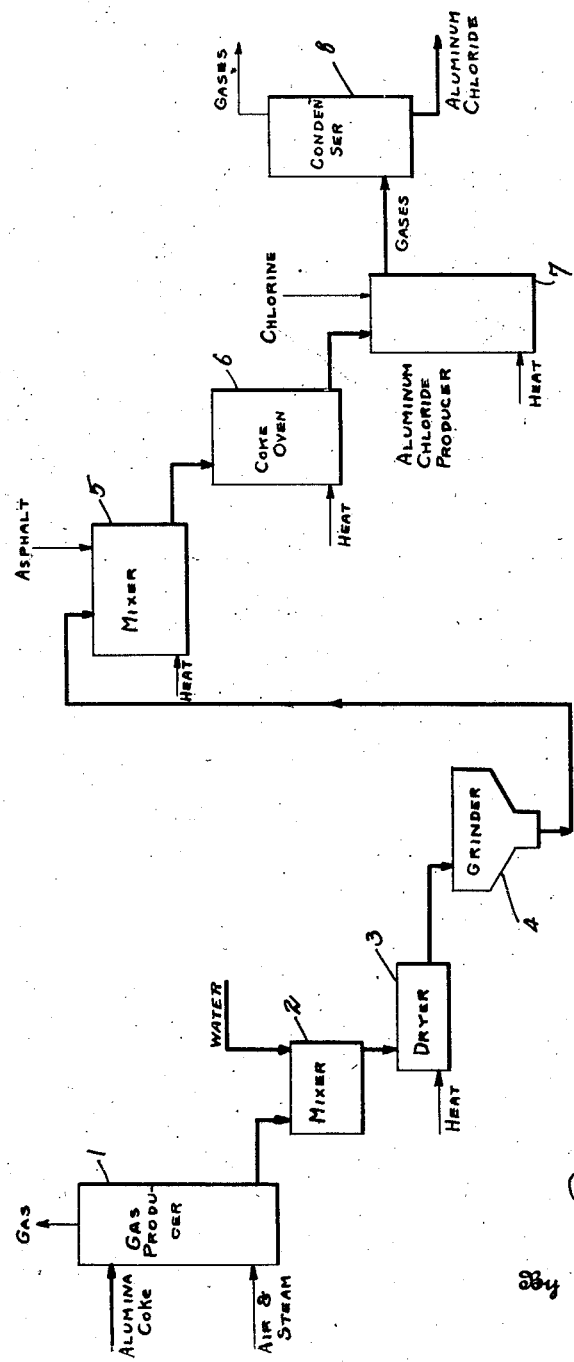
Inventor
Melvin M. Holm
By Lyon & Lyon
Attorneys Patented June 28, 1932

1,865,008

UNITED STATES PATENT OFFICE

MELVIN M. HOLM, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

PROCESS FOR THE MANUFACTURE OF ALUMINUM CHLORIDE

Application filed September 27, 1927. Serial No. 222,278.

This invention relates to the manufacture of aluminum chloride by the reaction of chlorine on a mixture of carbonaceous material and finely divided material containing aluminum.

An object of this invention is to disclose a process of utilizing finely divided materials containing alumina in the manufacture of aluminum chloride.

Another object is to increase the apparent density of finely divided aluminous materials to render them useful in the manufacture of aluminum chloride.

Another object is to disclose a process of making aluminum chloride from finely divided aluminous materials, particularly from the coke resulting from aluminum chloride treatment of oils.

An object of the invention is to recover as aluminum chloride the aluminum content of the ash in petroleum coke.

Aluminum chloride is generally manufactured by contacting an alumina-carbon mixture with chlorine gas at high temperature. The alumina-carbon mixture may be a mechanical combination of a natural alumina such as bauxite and coke or coal, in which case the reaction with chlorine is very slow, even if the solid materials are finely powdered and intimately mixed, and temperatures up to 1800° F. are used. If bauxite and asphalt are coked together at temperatures in the neighborhood of 1800° F. an exceptionally reactive alumina-carbon mixture is obtained which rapidly combines with chlorine at temperatures as low as 950° F. to produce aluminum chloride. The low reaction temperature may be maintained by externally heating the chlorination apparatus or by controlling the introduction of air when heat is supplied by internal combustion of a part of the carbon contained. By using lower temperatures in this manner to produce effective chlorination the consumption of fuel is reduced and efficiency of the reaction improved.

If it is desired to supply external heat and not depend on the internal combustion of carbon in the chlorination apparatus, it is possible to introduce approximately the correct amount of carbon in the alumina-carbon mixture for the most efficient reaction. It has been found that some additional carbon over the theoretical requirement must be charged but the excess carbon must be limited or it will tend to mask or cover up a large part of the alumina and prevent its reaction with chlorine. The carbon content of the alumina-carbon mixture should not exceed 50% of the alumina content or the reactivity of the mixture will be greatly impaired, and it should not be less than 20% of the alumina or the actual recovery will be reduced. The same result may be obtained by internal combustion of a portion of the carbon in the mixture if due allowance for carbon to the consumed is made in the amount of carbon introduced with the alumina-carbon mixture.

When petroleum coke derived from the residue of an aluminum chloride treatment of oil is consumed in a gas producer or otherwise burned, there remains a finely divided incombustible ash largely of alumina, and it is with the recovery of the aluminum content of such material as aluminum chloride that the invention is concerned.

Reaction between the carbon, alumina and chlorine gas is rendered more efficient when the alumina is in finely divided form. It is conceivable that a large lump of alumina coated with carbon would react with chlorine gas under required temperature conditions to form aluminum chloride, but after the outer surface of the lump had reacted with the carbon, the central portion of said lump would not react as no carbon would be in contact therewith. Fine grinding of aluminous materials, such as bauxite, clays, various aluminum silicates and the like, reduces the apparent density of these materials. For example, an aluminous clay weighing 140 lbs. per cu. ft. in large lumps, may weigh 30 lbs. per cu. ft. when ground, and provide a suitable medium for chlorination. However, lighter, more finely divided materials are hard to handle in the manufacture of aluminum chloride, as will be brought out more fully later.

When alumina ash or finely divided material containing alumina is coked with the proper amount of asphalt or heavy hydrocarbon to give a suitable carbon content for chlorination a powder is produced, which though reactive in the presence of chlorine, has a tendency to blow out of the chlorination apparatus along with the gases generated. To insure proper circulation of chlorine through the alumina-carbon mixture the powder must be spread in thin beds, which with the low gas velocities necessary to prevent the powder blowing out would require apparatus of uneconomic size and impractical design. If a considerable excess of asphalt is coked with the alumina a soft form of coke may be produced which although avoiding the difficulties of powder is wasteful of asphalt and inefficient in its reacting effect with chlorine.

By the process of the present invention, I am enabled to produce from alumina ash or finely divided material containing alumina and asphalt a reactive mixture of proper alumina-carbon ratio which can be treated in thick beds with chlorine gas at efficient velocities, so that substantially the entire alumina content may be converted to aluminum chloride and recovered. By alumina ash is meant a finely divided incombustible ash composed largely of alumina, said ash being produced by consuming petroleum coke or residue derived from aluminum chloride treatment of oils in a gas generator or otherwise burning such residue.

Although this invention is applicable to the utilization of any finely divided material containing alumina, I will describe in detail a preferred method of utilizing an alumina ash and recovering the alumina in the form of aluminum chloride. The accompanying drawing illustrates diagrammatically the various steps of the process and will enable anyone acquainted with the art to understand the invention.

Referring to the drawing, (1) represents a gas producer or other device in which coke containing alumina ash is consumed and from which the ash is recovered. The alumina remaining as ash in (1) is transported to a mixer (2) in which the alumina is preferably mixed or contacted with water to form a paste and thereafter dried in a suitable drier (3). The dried alumina paste is then carried to a grinder (4) in which it is pulverized and then passed to a mixer (5). In the mixer (5) the alumina is preferably mixed with molten asphalt in proportions to produce in the coking process a ratio of about two parts of carbon to five parts of alumina by weight. Although, as stated above, the alumina-water mixture may be dried before mixing with asphalt, the mixture of alumina and contacting liquid may be sent directly to the mixer (5) and added to the asphalt, the liquid being evaporated from the mixture either at the mixer (5) or during the subsequent coking operation.

The alumina-asphalt mixture is charged to a coke oven (6) and carbonized to coke by the application of external heat. While this coking operation is shown as a single step it may be preferable to heat the mixture preliminarily in steel apparatus to drive off most of the volatile matter at temperatures materially above the natural melting point of the asphalt but below the temperature for complete carbonization, as for instance at a dull red heat. The preliminary coke, thus produced may then be transferred to a coke oven lined with brick or other suitable material in which the coking is completed at temperatures approximating 1800° F., such as correspond to a yellow or white heat.

One of the advantages of coking the alumina-carbon mixture in two steps, as described, lies in the fact that the coke has a tendency to adhere strongly to the sides of the apparatus and if the retort is of metal the coke cannot be freed from the walls without damaging the equipment. While the preliminary coking eliminates most of the volatile matter it is necessary to complete the process at higher temperatures than desirable with steel apparatus, so the final step may be carried out in a brick lined oven. The material treated in the final step, however, having most of its original volatile matter removed does not melt and tend to form an adhesive coke, and if broken up in suitable sizes, up to say 3 inch lumps, after the first step, may be charged direct to the aluminum chloride producer without substantial loss of heat.

The alumina-carbon mixture produced in the coke oven (6) is conveyed to an aluminum chloride producer (7) where it is contacted with chlorine gas and subjected to external heat. The chlorine reacts with the alumina-carbon mixture at temperatures as low as about 950° F. to form vaporized aluminum chloride and fixed gases which pass to a condenser (8) where the aluminum chloride is condensed and recovered.

The step of contacting the finely divided aluminous material with a liquid has been found to increase the apparent density of the material, even though the liquid is removed and the treated material ground or disintegrated sufficiently to remove lumps, say 50 mesh. For example, when finely divided alumina ash weighing about 10 lbs. per cu. ft. was mixed with water, dried and ground, the resulting alumina weighed 26.8 lbs. per cu.

ft. The coke produced by mixing this treated alumina with preferred amounts of asphalt and carbonizing, was hard, dense and exceptionally suitable for the production of aluminum chloride by exposure to chlorine at elevated temperatures. This reaction will proceed rapidly and efficiently at temperatures considerably below those at which mechanical mixtures of alumina and carbon are reactive and while material amounts of aluminum chloride are produced at 950° F., for best results the process is operated between 1100° F. and 1650° F.

It is not known definitely why the steps of contacting a finely divided material with a liquid, removing the liquid and forming a coke from the treated material results in such an unexpected hard, dense coke, even though the treated material is ground after contacting with a liquid. Water is preferred as the contacting liquid, however aqueous solutions of well known coagulating agents, such as hydrochloric acid or sulphuric acid, or acid salts such as aluminum sulphate, or solutions of sodium silicate may be used.

While the process herein described is well adapted to carry out the objects of the present invention, it is understood that various modifications and changes may be made without departing from the spirit of the invention and that the invention includes all such modifications and changes as come within the scope of the following claims.

I claim:

1. A method of producing a coke adapted for use in the manufacture of aluminum chloride and containing finely divided aluminous material, comprising contacting a finely divided aluminous material with an aqueous liquid, removing the liquid and coking a mixture of the treated aluminous material with a heavy hydrocarbon.

2. A method of producing coke adapted for use in the manufacture of aluminum chloride and containing finely divided aluminous material, comprising contacting a finely divided aluminous material with water, substantially removing the water and coking such treated aluminous material with a carbonaceous material.

3. In a method of manufacturing aluminum chloride, the steps of contacting a finely divided aluminous material with water, substantially removing the water, coking such treated aluminous material with a carbonaceous material and subjecting the resulting coke to the action of chlorine at an elevated temperature.

4. In a method of manufacturing aluminum chloride, the steps of contacting a finely divided aluminous material with water, drying and disintegrating such materials, mixing such treated aluminous material with a heavy hydrocarbon, heating the mixture to eliminate a substantial portion of volatiles, further heating the mixture to form a coke and subjecting the coke to the action of chlorine at an elevated temperature.

5. A method of producing a coke adapted for use in the manufacture of aluminum chloride and containing finely divided aluminous material, comprising contacting a finely divided aluminous material with water, removing the water, mixing the treated aluminous material with a heavy hydrocarbon and coking the mixture, the coke thus produced containing between fifteen and thirty-five percent carbon.

6. In a method of manufacturing aluminum chloride, the steps of contacting a finely divided aluminous material with water, removing the water, mixing said treated material with an asphaltic material, subjecting the mixture to heat so as to eliminate a substantial portion of volatile matter, further heating the mixture to produce a coke, and subjecting the coke to the action of chlorine, the coke produced by this process containing two to five parts alumina to every part of carbon.

7. A method of manufacturing aluminum chloride comprising mixing a finely divided alumina ash with water, drying and disintegrating said ash, mixing the treated ash with an asphaltic material, heating the mixture so as to eliminate a substantial portion of volatiles, further heating the mixture so as to coke the same and subjecting the coke to the action of chlorine at an elevated temperature.

8. A method of producing a coke adapted for use in the manufacture of aluminum chloride, comprising contacting a finely divided alumina with an aqueous liquid, mixing the treated alumina with an asphaltic material and coking the mixture.

9. A method of manufacturing aluminum chloride comprising increasing the apparent density of a finely divided aluminous material by contacting said finely divided aluminous material with an aqueous liquid, removing the liquid, mixing the treated aluminous material with an asphaltic material, coking the mixture and subjecting the coke to the action of chlorine at an elevated temperature to produce aluminum chloride.

10. A method of producing a coke adapted for use in the manufacture of aluminum chloride, comprising increasing the apparent density of a finely divided material containing alumina, by contacting said material with an aqueous liquid, drying and disintegrating the treated material, mixing the treated material with an asphaltic material, and coking the mixture.

11. In a method of producing a coke adapted for use in the manufacture of aluminum chloride, the steps of contacting a finely divided aluminous material with an aqueous liquid, drying the finely divided material, mixing the dried material with a carbonaceous material, and then coking the mixture.

12. A method of manufacturing aluminum chloride, comprising contacting a finely divided aluminous material with an aqueous liquid, drying the finely divided aluminous material, mixing the dried material with a carbonaceous material, coking the mixture, and subjecting the coke to the action of chlorine at an elevated temperature.

Signed at Richmond, Cal., this 15th day of September, 1927.

MELVIN M. HOLM.